United States Patent [19]

Davis

[11] 4,240,192

[45] Dec. 23, 1980

[54] TOOL FOR AND METHOD OF REMOVING A DIE-CUTTING MAT FROM A ROTARY ANVIL

[75] Inventor: Richard F. Davis, Waynesville, N.C.

[73] Assignee: Dayco Corporation, Dayton, Ohio

[21] Appl. No.: 51,294

[22] Filed: Jun. 22, 1979

[51] Int. Cl.[3] ........................ B23P 19/04; B25B 27/16

[52] U.S. Cl. ........................................ 29/426.6; 29/278

[58] Field of Search ................. 29/426.6, 426.5, 426.1, 29/278, 280, 234, 235; 81/8.1; 30/317

[56] References Cited

U.S. PATENT DOCUMENTS

| | | | |
|---|---|---|---|
| 1,470,575 | 10/1923 | Kepler | 30/317 X |
| 2,787,491 | 4/1957 | Roberts | 30/317 X |
| 3,380,092 | 4/1968 | Golczynski | 81/8.1 X |
| 3,701,194 | 10/1972 | Widman | 29/278 |
| 3,783,492 | 1/1974 | Duckett et al. | 29/278 |

*Primary Examiner*—Milton S. Mehr

*Attorney, Agent, or Firm*—Charles E. Bricker; Reuben Wolk

[57] ABSTRACT

A tool for and method of removing a die-cutting mat from a rotary anvil is provided wherein such anvil has a groove therein provided with an immobile locking wedge disposed centrally therewithin and the die-cutting mat has flanges at opposite end portions thereof which are snap locked in position utilizing the locking wedge.

18 Claims, 7 Drawing Figures

TOOL FOR AND METHOD OF REMOVING A DIE-CUTTING MAT FROM A ROTARY ANVIL

CROSS-REFERENCE TO RELATED APPLICATION

This application is related to copending U.S. patent application Ser. No. 954,063 filed Oct. 19, 1978.

BACKGROUND OF THE INVENTION

1. Field of the Invention

This invention relates to a rotary anvil construction and in particular to a tool for and method of removing a die-cutting mat from a rotary anvil of such construction.

2. Prior Art Statement

It is known in the art to provide a rotary anvil which has an immobile locking wedge disposed within a longitudinal groove provided therein and wherein such wedge is particularly adapted to have flanges at opposite ends of a die-cutting mat snap locked thereagainst to fasten the mat on the rotary anvil and as disclosed in the above-mentioned U.S. patent application.

SUMMARY

It is a feature of this invention to provide a simple and inexpensive tool for removing a die-cutting mat from a rotary anvil which employs an immobile locking wedge to lock flanges provided at the opposite ends of such die-cutting mat in position against the anvil.

Another feature of this invention is to provide a tool of the character mentioned which is in the form of an easily operated hand tool.

Another feature of this invention is to provide a tool of the character mentioned comprising a mat-engaging portion including a roughly semicircular portion terminating in a wedge-like end.

Another feature of this invention is to provide a tool of the character mentioned in which the wedge-like end is a flat wedge-like end free of sharp corners.

Another feature of this invention is to provide an improved method of removing a die-cutting mat from a rotary anvil of the character mentioned.

Therefore, it is an object of this invention to provide an improved tool for and method of removing a die-cutting mat from a rotary anvil having one or more of the novel features set forth above or hereinafter shown or described.

Other details, features, uses, objects, and advantages of this invention will become apparent from the embodiments thereof presented in the following specification, claims and drawing.

BRIEF DESCRIPTION OF THE DRAWING

The accompanying drawing shows present preferred embodiments of this invention, in which.

DETAILED DESCRIPTION

Figure 1:
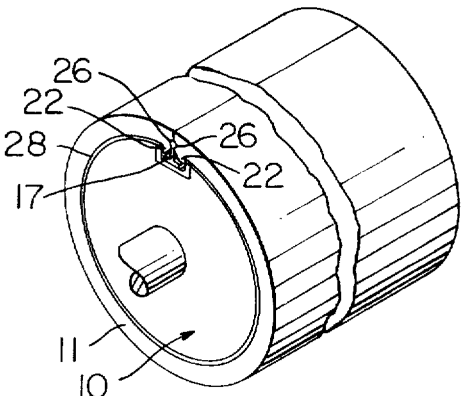
FIG. 1 is a perspective view of a rotary anvil having a die-cutting mat snap locked in position thereagainst.

Reference is now made to FIG. 1 of the drawing which illustrates one exemplary embodiment of a rotary anvil 10 of this invention which has a die-cutting mat 11 snap locked in position therearound in a manner to be subsequently described. The anvil 10 with the die-cutting mat 11 therearound is particularly adapted to be used with an associated cutter, such as a rotary cutter, having cutting devices or blades and the die-cutting mat 11 allows the blades of such rotary cutter to be urged against a workpiece to be cut enabling cutting of such workpiece with sharply defined edges and without damage to the cutting blades. The workpiece may be any suitable paper, plastic, or like workpiece which is to be cut as is known in the art. Because the rotary cutter and workpiece may be of suitable, well known types, neither is shown in the drawing.

The rotary anvil 10 comprises an outer substantially right circular cylindrical surface 13 having a pair of spaced holding surfaces 14 extending radially inwardly from the cylindrical surface and a planar surface 15 interconnecting the terminal inner edges of the holding surfaces 14. The holding surfaces 14 and planar surface 15 define opposed walls and a bottom wall respectively of a longitudinal groove 16 in the rotary anvil 10. The anvil 10 also has an immobile locking wedge 17 disposed within the groove 16 and the wedge 17 is suitably fixed in position and has a fixed locking surface 20 on each side thereof. Each locking surface 20 is spaced from an associated one of the holding surfaces 14 and defines a flange-receiving channel 21 therebetween; and, each channel 21 is particularly adapted to receive an integral flange 22 provided at each end portion of the die-cutting mat 11.

Figure 1A:
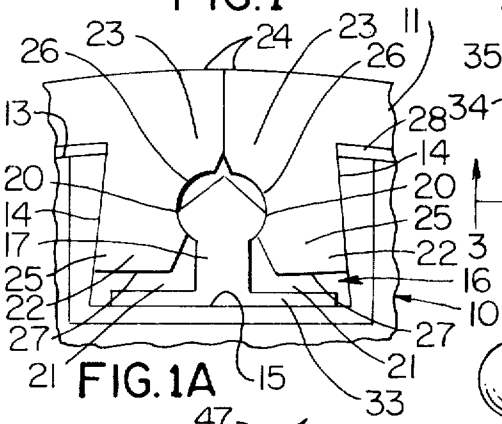
FIG. 1A is an enlarged fragmentary end view particularly showing the die-cutting mat locked in position.

The die-cutting mat 11 has a main body portion 24 disposed against the substantially cylindrical surface 13 of the anvil 10 and the flanges 22 extend substantially perpendicularly from the main body portion. Each of the flanges 22 has an inner portion 23 adjoining the mat 11 and an outer portion 25 yieldingly compressed within an associated channel 21, FIG. 1A. Each other portion 25 of each flange 22 has a cooperating locking surface 26 which cooperates with an associated locking surface 20 on the wedge 17 to lock the mat 11 on the rotary anvil 10. The locking surfaces 20 and 26 cooperate with the yieldable resilient character of the flanges to provide a snap lock action. Further, with the die-cutting mat locked in position, each outer portion 25 of each flange 22 has a terminal edge 27 disposed closely adjacent the planar surface 15.

The die cutting mat 11 is preferably made of a suitable compressible yet resilient elastomeric material, such as, a suitable rubber compound or a synthetic plastic material. In addition, to provide added strength for the main body portion 24, a suitable substrate or backing material 28 is preferably laminated against such body portion.

The wedge 17 illustrated in this disclosure has a base 33 fixed against surface 15 of the groove 16 and in essence, defining the bottom of such groove. However, it is to be understood that the wedge 17 may be defined as integral part of an E-shaped extrusion which may be fixed in the rotary anvil 10, as described in the above-mentioned patent application, whereby in such instance the inside surface of the bight of the E-shaped extrusion may be considered the bottom of the groove 16.

The rotary anvil 10, die cutting mat 11, and cooperating structural components thereof have been described herein with brevity; however, reference is made to the above mentioned United States patent application Ser. No. 954,063 in the event a more detailed presentation of these items is desired and the entire disclosure of such application, with its various embodiments, is incorporated herein by reference thereto.

Figure 3:
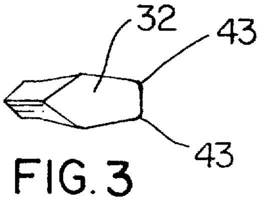
FIG. 3 is a view taken essentially on the line 3—3 of FIG. 2.
Figure 2:
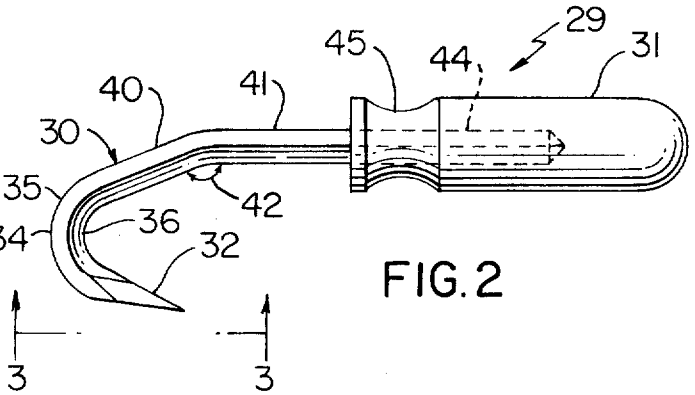
FIG. 2 is a view of one exemplary embodiment of a tool of this invention which may be used to remove the die-cutting mat from the rotary anvil.

In accordance with the teaching of this invention, a tool designated generally by the reference numeral 29 is provided and such tool has a mat-engaging portion which is designated generally by the reference numeral 30 and a handle 31, FIGS. 2 and 3. The mat-engaging portion 30 has a wedge-like end 32 terminating in a substantially sharp edge and the end 32 is adapted to be wedged between the rotary anvil 10 and the mat 11 closely adjacent an associated flange 22, as shown at 49 in FIG. 4, to provide an initial lifting of the associated flange 22 away from the planar surface 15 to thereby dislodge a portion of the cooperating locking surface 26 of the associated mat flange 22 from its locking surface 20 of the wedge 17.

The mat-engaging portion 30 of the tool 29 has a roughly semicircular portion 34 adjoining the wedge-like end 32 and the semicircular portion 34 has a convex outside surface 35 and a concave inside surface 36. The convex outside surface 35 is adapted to engage the rotary anvil and serve as a fulcrum for prying a terminal end portion of an associated closely adjacent flange 22 from within its channel 21. The concave inside surface 36 is adapted to engage a portion of the terminal edge 27 of the flange 22 with the wedge-like end 32 against the inner portion of the associated flange 22 as shown at 38 in FIG. 5 thereby enabling pulling of the tool 29 using the handle 31 with the concave inside surface 36 serving as a prying surface which dislodges the cooperating locking surface 26 of the associated flange from the locking surface 20 of its locking wedge 17 along the full axial length of rotary anvil 10 upon pulling the tool 29 along the cylindrical surface 13 adjacent an associated holding surface 14.

Referring again to FIGS. 2 and 3, it is seen that the mat-engaging portion 30 of the tool 29 has a first straight portion 40 adjoining the semicircular portion 34 and such tool also has a second straight portion 41 extending between the straight portion 40 and the handle 31 with an obtuse included angle 42 therebetween. The straight portion 41 and handle 31 have a common central longitudinal axis.

The semicircular portion 34 is of comparatively small radius generally of the order of one inch and extends through an approximate obtuse angle of greater than 150°. In addition, the semicircular portion 34 and the straight portions 40 and 41 are disposed in a common plane whereby the tool may be used effectively as a prying tool as well as a pulling device.

The wedge-like end 32 of the tool 29 is a flat wedge-like end and has rounded corners 43 free of sharp edges, FIG. 3. The rounded corners enable the tool to be pulled in the manner previously mentioned and shown in FIGS. 5 and 6 with the concave inside surface 36 of mat-engaging portion 30 providing a prying action during such pulling and with the rounded corner 43 in contact with the mat 11 providing a minimum tendency for such corner to gouge into the mat material.

The tool 29 may be made of any suitable material and preferably the handle portion is made of a non-metallic material such as wood, hard plastic, hard rubber, or the like, while the remaining portion of such tool is made of a comparatively hard metallic material. The metallic material has a part 44 thereof suitably embedded within the handle portion or handle 31. Further, the handle 31 may have a suitable annular groove 45 therein to enable easy grasping and holding with one hand; and, if desired, the handle may be provided with longitudinal grooves, a knurled outer surface, and the like, for better gripping.

Figure 4:
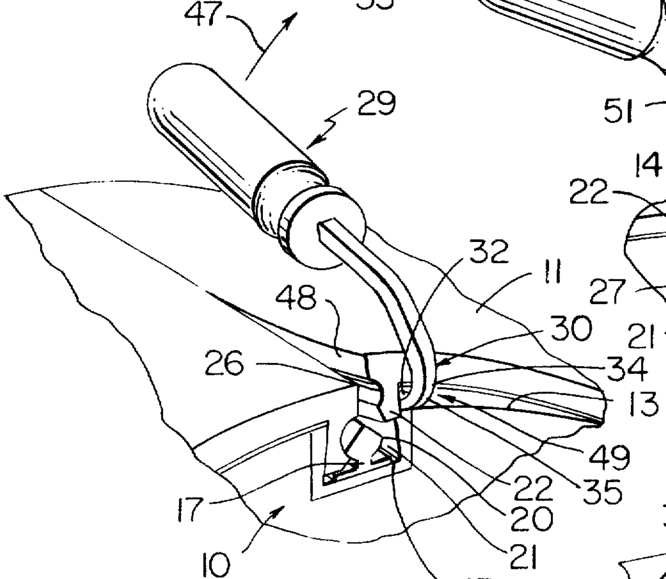
FIGS. 4 through 6 illustrate method steps which may be used in removing the die-cutting mat from the rotary anvil.
Figure 6:
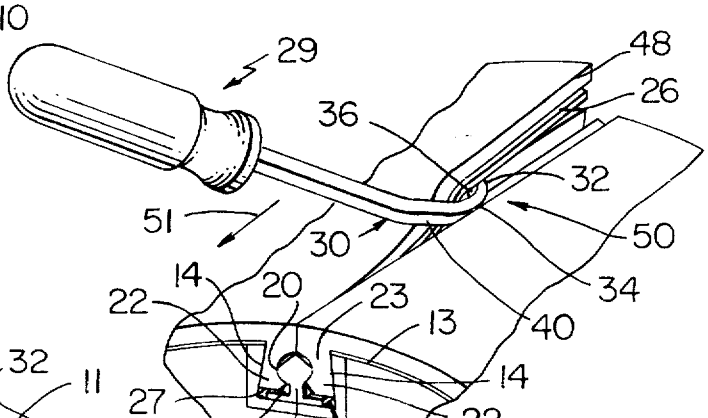
Figure 5:
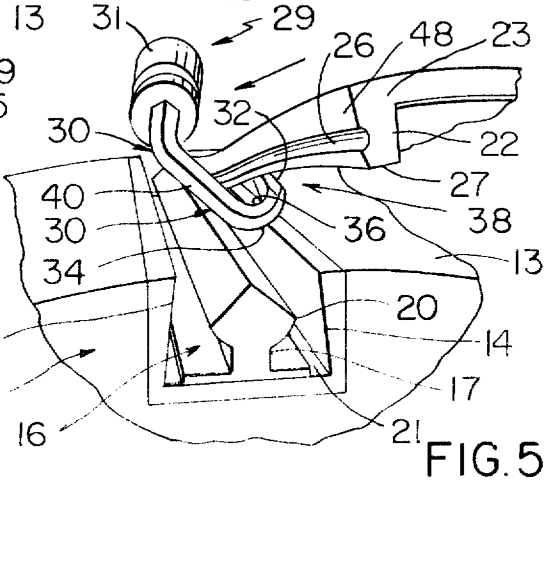

Having described the rotary anvil 10 with the die-cutting mat 11 snap locked in position thereagainst and the tool 29 which may be used in removing the die-cutting mat from the rotary anvil, reference is now made to FIGS. 4–6 of the drawing for a more detailed presentation of the method which may be used in removing the mat 11 from the rotary anvil 10.

In particular, the method of removing the mat is preferably carried out employing the tool 29 whereby the key method steps employed comprise wedging the wedge-like end 32 between rotary anvil 10 closely adjacent an associated flange 22, as shown in FIG. 4, to provide an initial lifting of the associated flange 22 away from the planar surface 15 to thereby dislodge a portion of the cooperating locking surface 26 of the associated mat flange from its locking surface 20 of the wedge 17. The handle 31 of the tool 29 is then pivoted substantially in a diametral plane as shown by the arrow 47 away from the open end of the semicircular portion 34 of tool 29 and with the convex outside surface 35 engaging the cylindrical surface 13 and with surface 35 serving as a fulcrum for prying a terminal end portion 48 of the associated flange 22 from its channel 21.

Once the terminal end portion 48 of a flange 22 is pried away, the concave inside surface 36 of the tool 29 is urged against the associated flange 22 being removed adjacent its terminal edge 27 as shown at 38 in FIG. 5; and, the concave inside surface 36 is moved against the terminal edge portion of its flange 22 by rotating the tool and handle so that the previously described common plane, containing the semicircular portion 34 and straight portion 40, is disposed substantially tangent to the cylindrical surface 13 and transverse the previously mentioned diametral plane. The wedge-like end 32 is simultaneously disposed against the inner portion of the associated flange.

The removal of the flange 22 is continued by pulling of the tool 29 along the rotary anvil as shown by the arrow 51 in FIG. 6 and this may be achieved by an operator grasping the handle 31 with one hand and providing the required pulling action. As indicated earlier, during this pulling action the concave inside surface 36 serves as a prying surface which dislodges the cooperating locking surface 26 of the associated flange 22 from its locking surface 20 of the locking wedge 17 along the full axial length of each upon pulling the tool 29 along the cylindrical surface 13.

The pulling of the tool 29 along the rotary anvil 10 to unlock or pry away an associated flange 22 from such anvil is achieved with the mat-engaging portion 30 engaging that portion of the cylindrical surface 13 which adjoins the groove 16. The tool 29 is manipulated and pulled so that the terminal edge 32 thereof does not move along and against the inside holding surface 14, the wedge 17, or any structure defining the inside of the channel 16. Instead the edge 32 moves along the inside surface of the mat flange 22 in a non-gouging manner.

Once one of the flanges 22 is unlocked or removed from its channel 21, the procedure may be repeated for the other mat flange 22. It will also be appreciated that once one flange 22 is removed, the main body portion 24 may be unwrapped from the rotary anvil 10 and the other flange 22 pulled away by hand simply by pulling the body portion 24 and the attached flange substantially radially outwardly.

In this disclosure of the invention, the wedge-like end 32 of tool 29 has been described as being used to first provide a wedging action between the mat 11 and the cylindrical surface 13 of the rotary anvil 10 at a position closely adjacent an associated mat flange 22. The wedging action is then followed by the pivoting step and other steps as described. However, it is to be understood that the tool 29 or a similar modified tool may be used to provide a wedging action between the terminal edge 27 of a flange 22 and rotary anvil structure therebeneath to provide a wedging action and then also followed by the pivoting step and other described steps.

The wedge-like end 32 has been described previously as terminating in a substantially sharp edge and it will be appreciated that this edge may be defined utilizing any technique known in the art. For example, a grinding wheel or the like may be employed to define the wedge-like end 32 and thereby provide a surface in the terminal outer portion, i.e., away from the handle 31, of the wedge-like end 32 which has an arcuate configuration on a particular radius.

While present exemplary embodiments of this invention, and methods of practicing the same, have been illustrated and described, it will be recognized that this invention may be otherwise variously embodied and practiced within the scope of the following claims.

I claim:

1. In a tool for removing a die-cutting mat from a rotary anvil wherein said anvil comprises, an outer substantially cylindrical surface having a pair of spaced holding surfaces extending radially inwardly from said cylindrical surface and a planar surface interconnecting the terminal inner edges of said holding surfaces, said holding surfaces and planar surface defining opposed walls and a bottom wall respectively of a longitudinal groove in said anvil and an immobile locking wedge disposed within said groove and having a fixed locking surface on each side thereof, each locking surface being spaced from an associated one of said holding surfaces to define a flange-receiving channel therebetween, and said die-cutting mat being disposed against said anvil and having opposite end portions terminating in a pair of identical flanges each disposed substantially perpendicular to the main body of said mat, each of said flanges having an inner portion adjoining said mat and an outer portion yieldingly compressed within an associated channel, each outer portion having a cooperating locking surface which is snap locked against an associated locking surface of said wedge to lock its flange in position with the outer portion yieldingly compressed within its associated channel and each outer portion having a terminal edge, the improvement wherein said tool comprises, a mat-engaging portion and a handle therefor, said mat-engaging portion having a wedge-like end adapted to be wedged between said mat and anvil to provide an initial lifting of an associated flange away from said anvil to thereby dislodge a portion of the cooperating locking surface of the associated mat flange from its locking surface of said wedge, said mat-engaging portion having a roughly semicircular portion adjoining said wedge-like end wherein said semicircular portion has a convex outside surface and a concave inside surface, said convex outside surface being adapted to engage said anvil and serve as a fulcrum for prying a terminal end portion of said associated flange from within its channel, said concave inside surface being adapted to engage a portion of said terminal edge with said wedge-like end against the inner portion of said associated flange thereby enabling pulling of said tool using said handle with said concave inside surface serving as a prying surface which dislodges the cooperating locking surface of said associated flange from the locking surface of said locking wedge along the full length of each upon pulling said tool along said cylindrical surface adjacent an associated holding surface.

2. A tool as set forth in claim 1 in which said mat-engaging portion also has a first straight portion adjoining said semi-circular portion.

3. A tool as set forth in claim 2 comprising a second straight portion extending between said first straight portion and said handle with an obtuse included angle therebetween, said second straight portion and handle having a common longitudinal axis.

4. A tool as set forth in claim 3 in which said obtuse angle has an angular measure greater than 150°.

5. A tool as set forth in claim 3 in which said semicircular portion and straight portions are disposed in a common plane.

6. A tool as set forth in claim 5 in which said wedge-like end terminates in a substantially sharp edge.

7. A tool as set forth in claim 6 in which said substantially sharp edge of said wedge-like end has rounded corners.

8. A tool as set forth in claim 7 in which said handle is adapted to be grasped with one hand and is made of a nonmetallic material and the remainder of said tool is made of metal.

9. In a method of removing a die-cutting mat from a rotary anvil wherein said anvil comprises, an outer substantially cylindrical surface having a pair of spaced holding surfaces extending radially inwardly from said cylindrical surface and a planar surface interconnecting the terminal inner edges of said holding surfaces, said holding surfaces and planar surface defining opposed walls and a bottom wall respectively of a longitudinal groove in said anvil and an immobile locking wedge disposed within said groove and having a fixed locking surface on each side thereof, each locking surface being spaced from an associated one of said holding surfaces to define a flange-receiving channel therebetween, and said die-cutting mat being disposed against said anvil and having opposite end portions terminating in a pair of identical flanges each disposed substantially perpendicular to the main body of said mat, each of said flanges having an inner portion adjoining said mat and an outer portion yieldingly compressed within an associated channel, each outer portion having a cooperating locking surface which is snap locked against an associated locking surface of said wedge to lock its flange in position with the outer portion yieldingly compressed within its associated channel and each outer portion having a terminal edge, the improvement in said method comprising the steps of, forming a tool having a mat-engaging portion having a roughly semicircular portion comprising a convex outside surface and a concave inside surface and terminating in a wedge-like end, wedging said wedge-like end between said mat and anvil to provide an initial lifting of an associated flange away from said anvil to thereby dislodge a portion of the cooperating locking surface of the associated mat flange from its locking surface of said wedge, pivoting said handle of said tool away from the open end of said semicircular portion with said convex outside surface engaging said anvil and serving as a fulcrum for prying a terminal end portion of said associated flange from within its channel, urging said concave inside surface against said associated flange adjacent its terminal edge with said wedge-like end against the inner portion of the associated flange, and pulling said tool along said rotary anvil using said handle with said concave inside surface urged against the associated flange adjacent its terminal edge, said concave inside surface serving as a prying surface which dislodges the cooperating locking surface of the associated flange from its locking surface of said locking wedge along the full length of each upon pulling said tool along said cylindrical surface.

10. A method as set forth in claim 9 in which said pivoting step is achieved with said tool disposed substantially in a diametral plane of said anvil.

11. A method as set forth in claim 10 in which said urging step comprises the further step of rotating said tool prior to said pulling step such that it is disposed substantially transverse the position thereof during said pivoting step.

12. A method as set forth in claim 11 and comprising the further steps of unwrapping said rotary anvil following said pulling step and pulling radially outwardly against said mat and the other of said pair of mat flanges to remove said other mat flange from within its channel.

13. A method as set forth in claim 11 and comprising the further steps of using said tool and repeating said wedging, pivoting, urging and pulling steps on the other of said pair of mat flanges to remove same from within its channel.

14. A method as set forth in claim 11 in which said forming step comprises forming said mat-engaging portion with a first straight portion adjoining said semicircular portion.

15. A method as set forth in claim 14 in which said forming step further comprises forming a second straight portion in said tool between said first straight portion and said handle with an obtuse included angle therebetween, said second straight portion and handle having a common longitudinal axis.

16. A method as set forth in claim 15 in which said forming step comprises forming said obtuse included angle having a measure greater than 150°.

17. A method as set forth in claim 15 in which said forming step comprises forming said semicircular portion and straight portions substantially in a common plane.

18. A method as set forth in claim 17 in which said forming step comprises forming said wedge-like end free of sharp side edges.

* * * * *